United States Patent
Goerke

(10) Patent No.: US 6,265,847 B1
(45) Date of Patent: Jul. 24, 2001

(54) RECHARGEABLE BATTERY CONTROL DEVICE

(75) Inventor: Thomas Goerke, London (GB)

(73) Assignee: ICO Services Ltd., London (GB)

( * ) Notice: Subject to any disclaimer, the term of this patent is extended or adjusted under 35 U.S.C. 154(b) by 0 days.

(21) Appl. No.: 09/251,354

(22) Filed: Feb. 17, 1999

(30) Foreign Application Priority Data

Jul. 16, 1998 (EP) .................................................. 98305691

(51) Int. Cl.$^7$ ...................................................... H02J 7/00
(52) U.S. Cl. .......................................... 320/126; 320/128
(58) Field of Search ................................... 320/126, 128, 320/134, 136; 307/44, 50

(56) References Cited

U.S. PATENT DOCUMENTS

| | | | | |
|---|---|---|---|---|
| 4,017,779 | * | 4/1977 | McDonald | 320/126 |
| 4,281,278 | * | 7/1981 | Bilsky | 320/136 |
| 5,264,777 | * | 11/1993 | Smead | 320/126 |
| 5,640,078 | * | 6/1997 | Kou et al. | 320/124 |
| 5,847,541 | * | 12/1998 | Hahn | 320/111 |
| 6,034,507 | * | 3/2000 | Ikawa et al. | 320/136 |
| 6,081,096 | * | 6/2000 | Barkat et al. | 320/124 |

FOREIGN PATENT DOCUMENTS

| | | |
|---|---|---|
| 0 665 627 A2 | 8/1994 | (EP) . |
| 2 306 813 | 5/1997 | (GB) . |
| 5-207670 | 8/1993 | (JP) . |
| 6-111852 | 4/1994 | (JP) . |

OTHER PUBLICATIONS

"Intelligent Battery Discharge Control", IBM Technical Disclosure Bulletin, vol. 37, No. 9, Sep. 1994, pp. 29–31.
Standards Coordinating Committee 10, Terms and Definitions, Jane Radatz, Chair, "the IEEE Standard Dictionary of Electrical and Electronics Terms," pp. 82 and 141.*

* cited by examiner

Primary Examiner—Peter S. Wong
Assistant Examiner—Gregory J. Toatley, Jr.
(74) Attorney, Agent, or Firm—McDermott, Will & Emery

(57) ABSTRACT

A control device (7) located in battery operated device or battery pack is used to control charging and discharging cycles of a pair of rechargeable batteries (6a, 6b). The device determines which of the batteries is least charged and, if not already fully discharged, allows power to be drawn from the battery until it becomes fully discharged. The device then allows the other battery to be drained. When the batteries are placed in a charger (3), the control device only allows fully discharged batteries to be charged. In this way, only full discharge and charge cycles are performed, which maximises the lifetime of the batteries.

6 Claims, 7 Drawing Sheets

DISCHARGING (BATTERY SELECTION)

DISCHARGING
(BATTERY IN USE)

CHARGING

RECHARGEABLE BATTERY CONTROL DEVICE

FIELD OF THE INVENTION

The present invention relates to a control device to control charging and discharging of rechargeable cells for a battery operated device which consumes power from the cells.

BACKGROUND

Rechargeable batteries are commonly used in electrical appliances such as mobile phones, electric shavers and portable music systems. It is well known that to maximise battery performance and to prolong the life of the battery, as measured by the number of charge/discharge cycles, that the battery must be fully discharged before being fully charged. However, for convenience, it is preferable to keep the battery in a state of constant readiness, that is, always fully charged. Therefore, it is common practice to charge a partially drained battery. This causes the battery performance to deteriorate, and the battery is said to exhibit a "memory effect".

SUMMARY OF THE INVENTION

The present invention seeks to prevent the deterioration of rechargeable batteries due to improper charging.

According to the present invention there is provided a battery charge/discharge control system comprising a battery operated device, to be driven by a discharge current from a rechargeable cell, and a battery control device, to control charging and discharging of rechargeable cells, comprising charging control circuitry to select a discharged cell and permit charging of said cell to a maximum charging level, and discharging control circuitry to select a partially charged cell and permit it to discharge so as to drive the battery operated device, and permit it to discharge to a discharged level.

The system may include measuring circuitry to measure the level of charging of a cell. The measuring circuitry may be a voltmeter.

Accordingly, the system may comprise a comparator to compare levels of charging of cells.

Preferably, the system includes switching circuitry to switch between the cells.

According to the present invention, there is provided a method of controlling charging and discharging battery cells that drive a battery operated device comprising selecting a discharged cell and permitting charging of said cell to a maximum charging level and selecting a partially charged cell and permitting it to discharge so as to drive the battery operated device and permitting it to discharge to a discharge level, prior to recharging.

Thus, only full charging and discharging of the battery cells are performed which maximises their lifetime.

BRIEF DESCRIPTION OF THE DRAWINGS

In order that the invention may be more fully understood, an embodiment thereof will now be described, by way of example, with reference to the accompanying drawings, in which.

DETAILED DESCRIPTION

Figure 1:
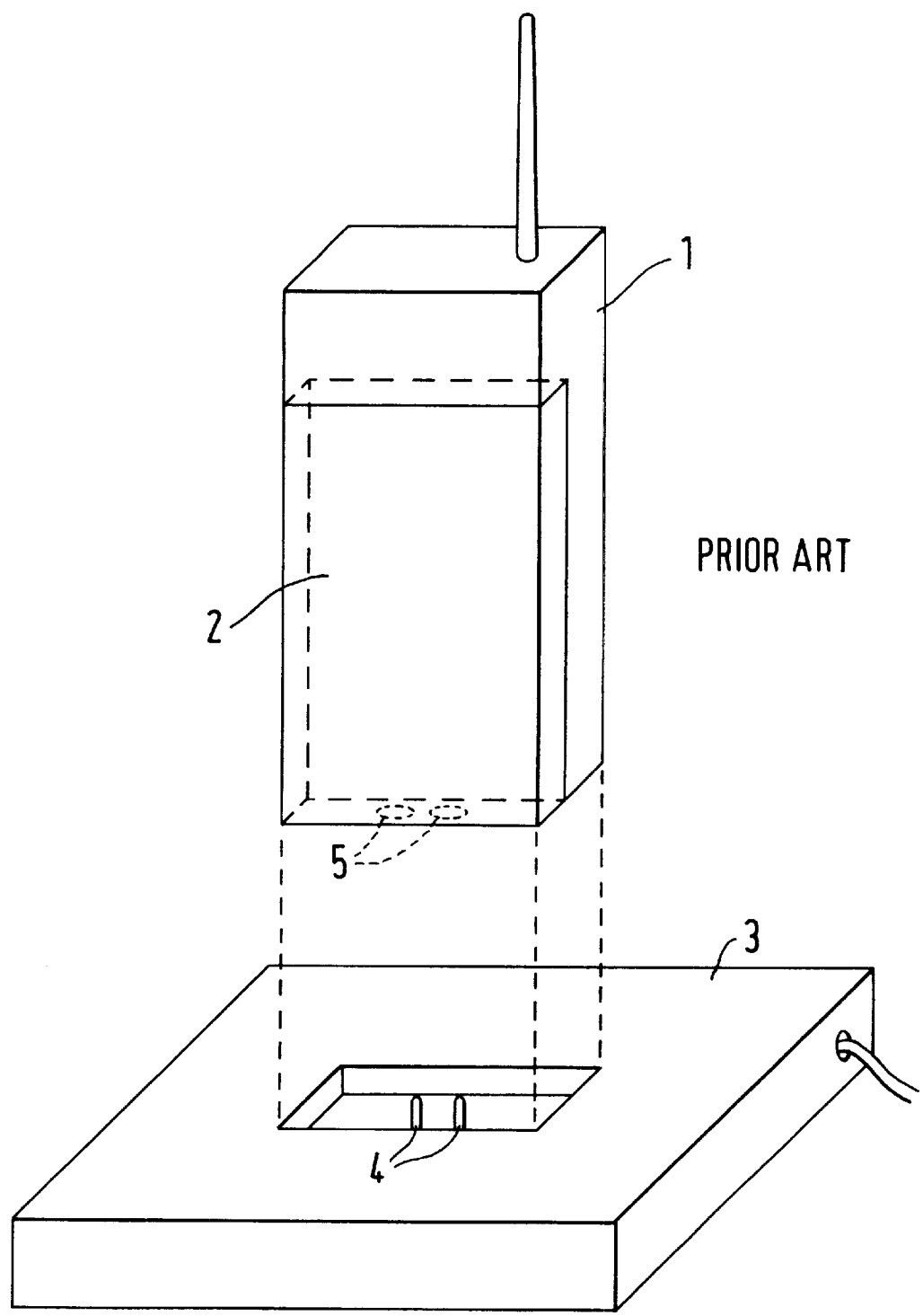
FIG. 1 illustrates a conventional mobile phone handset and a power supply unit.

Referring to FIG. 1, a known mobile phone handset 1 comprises a Nickel-Metal Hydride (NiMH) rechargeable battery 2 with a 1000 mAh capacity. The battery is charged with power supplied from a power supply unit 3, which also serves as a cradle to hold the handset steady during charging. Power is delivered from male connecting members 4 of the power supply 3 to the battery 2 through female connecting members 5.

Figure 2:
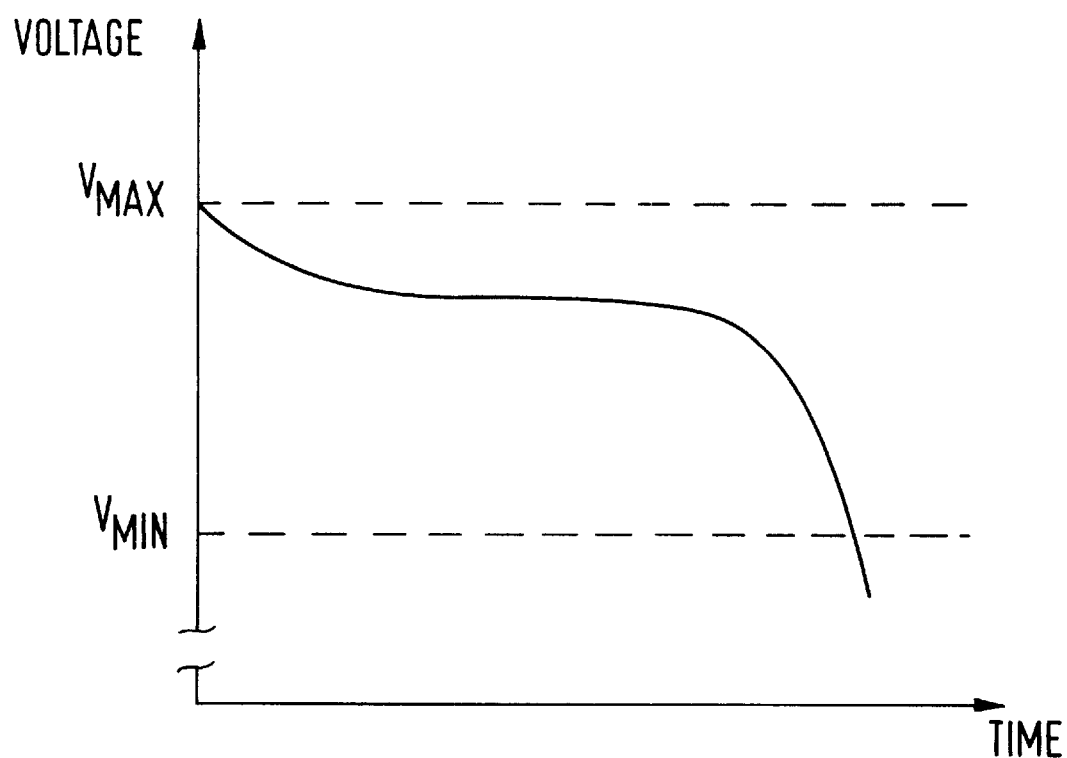
FIG. 2 illustrates the drop in the voltage across a typical rechargeable battery as it is discharged.

Referring to FIG. 2, the battery 2 can be safely charged to a maximum charging voltage, $V_{max.}$, which is typically about 1.4 volts. When in use, the handset 1 draws power from the battery 2 and the voltage, V, appearing across the battery terminals falls. When most of the charge is drained, there is a rapid drop in voltage. The battery 2 is effectively drained of charge and can no long power the handset 1, once the voltage drop below a fully discharged voltage, $V_{min}$, which is typically 1.1 volts. The handset 1 then needs to be placed in the power supply unit 3 to recharge the battery 2.

Draining a fully charged battery 2 such that the battery voltage, V, drops from the maximum charging voltage, $V_{max}$, down below the fully discharged voltage, $V_{min}$, is called a full discharge. Charging the battery 2 from below the fully discharged voltage, $V_{min}$, to the maximum charging voltage, $V_{max}$, is called a full charge. A full discharge followed by a full charge is called a full charging cycle. It is well known to those skilled in the art that a full charging cycle maximises the lifetime of the battery. Typically, a NiMH rechargeable battery has a lifetime of about 500 to 1000 cycles. After that, the battery capacity falls and is incapable of holding a useful amount of charge for any significant period of time.

The lifetime of the battery 2 is considerably shortened if the battery is not charged using full charging cycles. Incomplete charge cycles can include:

fully charging a partially discharged battery, partially charging a fully discharged battery and partially charging (i.e. not to full charge) a partially discharged battery.

Repeated incomplete charging cycles leads to the battery 2 exhibiting a "memory effect", in other words, showing signs of accelerated ageing. The battery 2 becomes quickly discharged, so quickly in fact, that the battery 2 is rendered unusable.

Unfortunately, full charging cycles are not always practical for mobile phone users and incomplete charging cycles are commonly performed. For example, prior to a journey, outing or day at work, when the user expects to be make or receive a calls and will not have access to a charger, the user will "top-up" a partially discharged battery with further charge.

Figure 4:
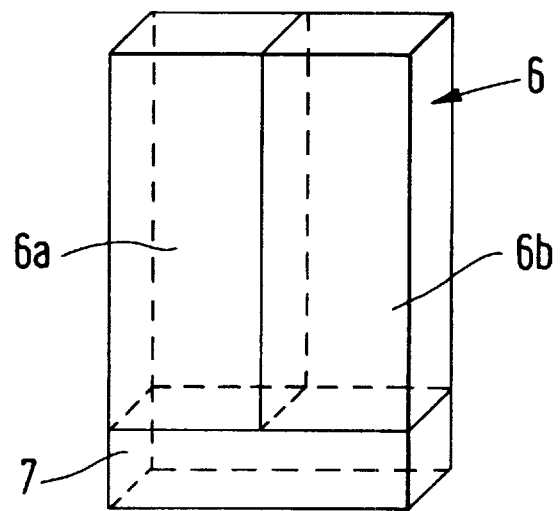
FIG. 4 shows two rechargeable batteries sharing the same battery housing.
Figure 3:
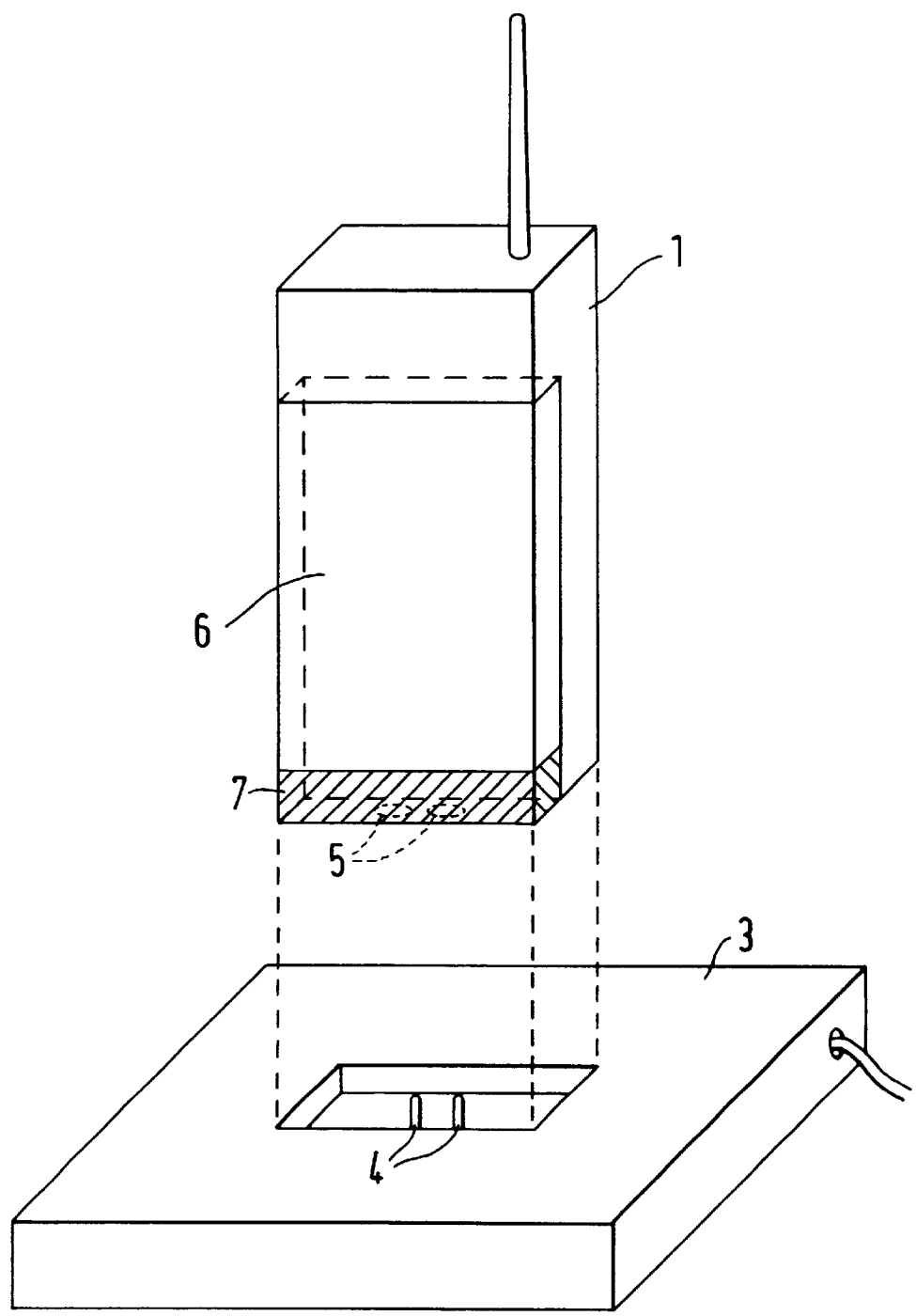
FIG. 3 shows a mobile phone handset including a partitioned battery and a control device in accordance with the present invention.

Referring to FIGS. 3 and 4, a first embodiment of the present invention is a mobile phone handset 1 comprising a partitioned NiMH battery 6, which yields first and second batteries 6a, 6b, each having approximately half the capacity of the prior art battery. The partitioned battery 6 further comprises a battery charging and discharging control device 7 built into the body of the battery casing. The partitioned battery 6 and the prior art battery 2 are much the same in look, weight and total charge capacity. Furthermore the partitioned battery 6 is characterised by the same maximum charging voltage, $V_{max}$, and the same fully discharged voltage, $V_{min}$. However, the control device 7 ensures that only full charge cycles of each battery 6a, 6b are performed, thereby maximising the lifetime of the batteries 6a, 6b. The batteries 6a, 6b are charged using the same power unit 3, from male connecting members 4, through female connecting members 5. However, rather than passing directly to the batteries 6a, 6b, the power is switched through the control device 7. The control device 7 also controls the power supply from the batteries 6a, 6b, to the handset 1.

Figure 5:
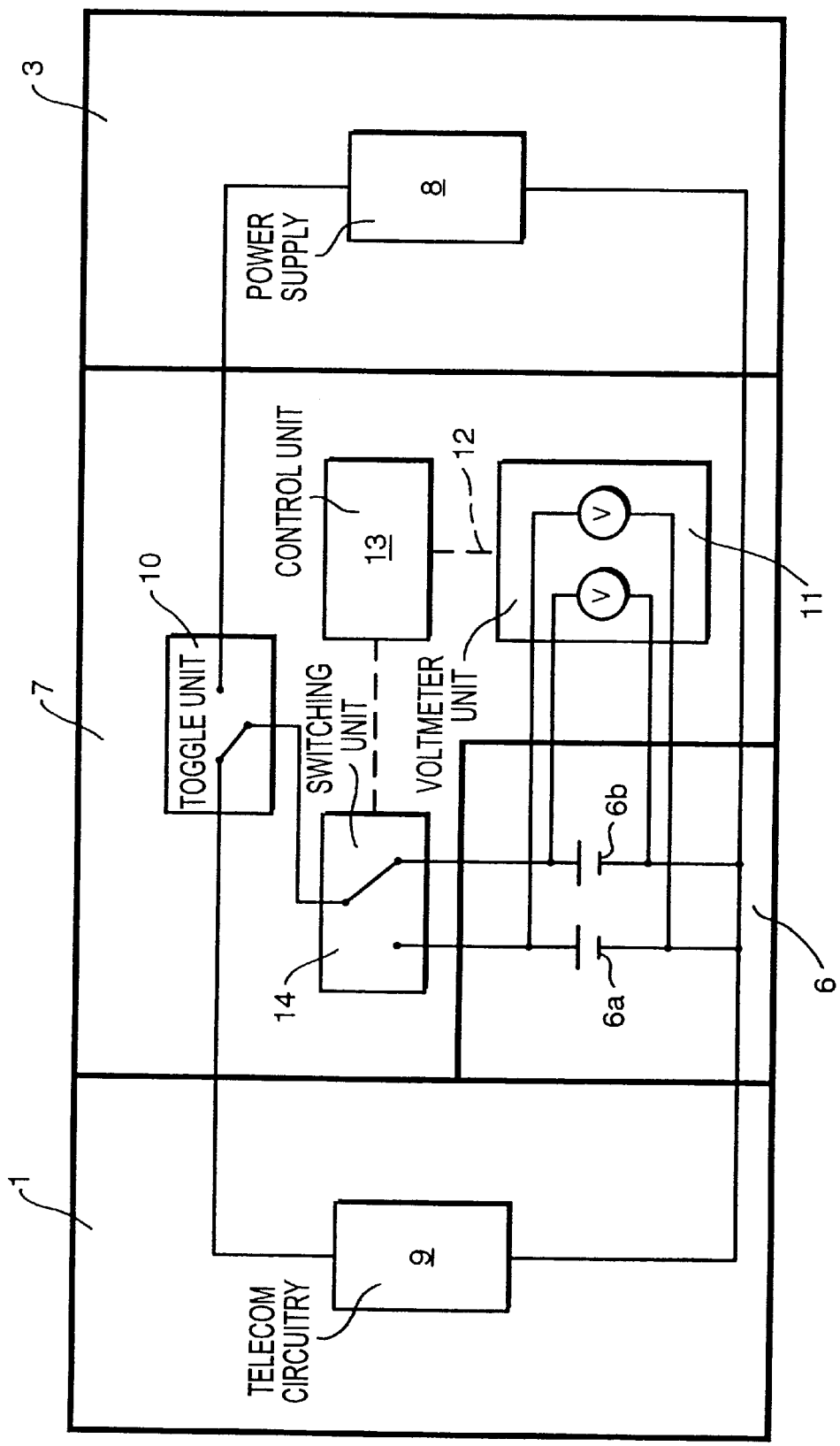
FIG. 5 shows the control device circuits in accordance with the present invention.

Referring to FIG. 5, the control device 7 serves as an interface between the partitioned battery 6 and a stabilised power supply 8 contained in the power supply unit 3, and the partitioned battery 6 and telecommunications circuitry 9 contained in the mobile handset 1. The control device 7 switches between charging and discharging circuits, measures the degree to which each battery 6a, 6b is charged and switches between them accordingly. Thus, when the handset 1 draws power, the control device 7 can choose the most suitable of the two batteries 6a, 6b. Also, when the batteries 6a, 6b are being charged, the control device 7 can choose which of the two batteries, if any, is ready for a full charge.

Charging/Discharging Criteria

The criteria by which first and second batteries 6a, 6b are charged and discharged are as follows:

Charging

If both first and second batteries 6a, 6b of the partitioned battery 6 are fully discharged, with battery voltages less than the fully discharged voltage, $V_{min}$, then control device 7 permits both batteries to be charged. The first battery 6a is fully charged to the maximum charge voltage, $V_{max}$. Then the second battery 6b is charged in a similar fashion.

If either one of the batteries 6a, 6b is partially charged, with a battery voltage greater than the fully discharged voltage, $V_{min}$, then said battery is not charged. The first battery 6a is tested and, if it is fully discharged, it is charged. If it is already partially charged, charging is skipped. The second battery 6b is tested. Again, if it is already charged, no further charging is performed. Charging is finished once both batteries 6a, 6b have been tested and, if appropriate, charged.

Discharging

If both first and second batteries 6a, 6b of the partitioned battery 6 are fully charged with battery voltages greater than the fully discharged voltage, $V_{min}$, then control device 7 selects the second battery to be drained. This choice is arbitrary.

If both the first and second batteries 6a, 6b of the partitioned battery 6 are partially charged to the same degree, with battery voltages greater than the fully discharged voltage, $V_{min}$, then control device 7 still selects the second battery.

If both the first and second batteries 6a, 6b of the partitioned battery 6 are partially charged with battery voltages greater than the fully discharged voltage, $V_{min}$, but one of the batteries is less charged than the other, then control device 7 selects the less charged battery to be drained first.

Once a battery has been selected it is exclusively used until it is fully discharged. Then the control device 7 tests both batteries again and, if one is available, selects a partially or fully charged battery for use.

To prevent a break in power supply when the control device switches from one battery to the other, a smoothing capacitor can be employed parallel to the telecommunications circuit. The required capacitance will be dependent on the switching time and current drawn.

Detailed Description of Control Device

Referring to FIG. 5, the control device 7 comprises a toggling unit 10 which switches the control device between two modes: a) control of discharging and b) control of charging. The toggling unit 10 can be a electrical relay that uses power from the power supply unit 3 to switch the control device 7 to charging mode when the mobile handset 1 is inserted into the cradle of the power supply unit 3. The control device 7 includes a voltmeter unit 11, to measure voltages across the first and second batteries 6a, 6b. This information is sent by information lines 12 to a control unit 13, which compares the voltages against each other and against pre-programmed levels. In response to these comparisons, the control unit commands a switching unit 14 to switch between the first and second batteries 6a, 6b.

Figure 6:
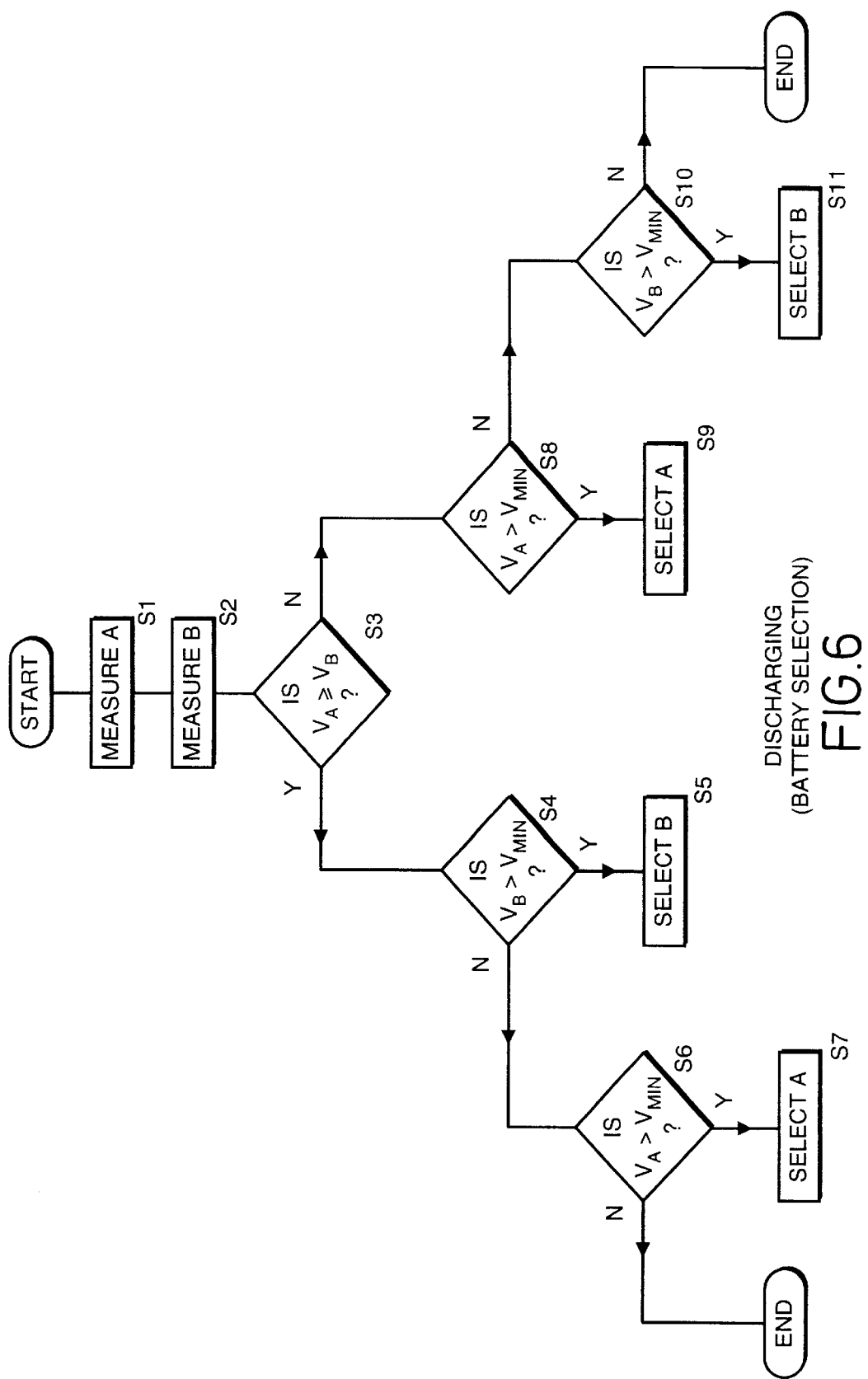
FIG. 6 is a process flow diagram for selecting a battery.
Figure 7:
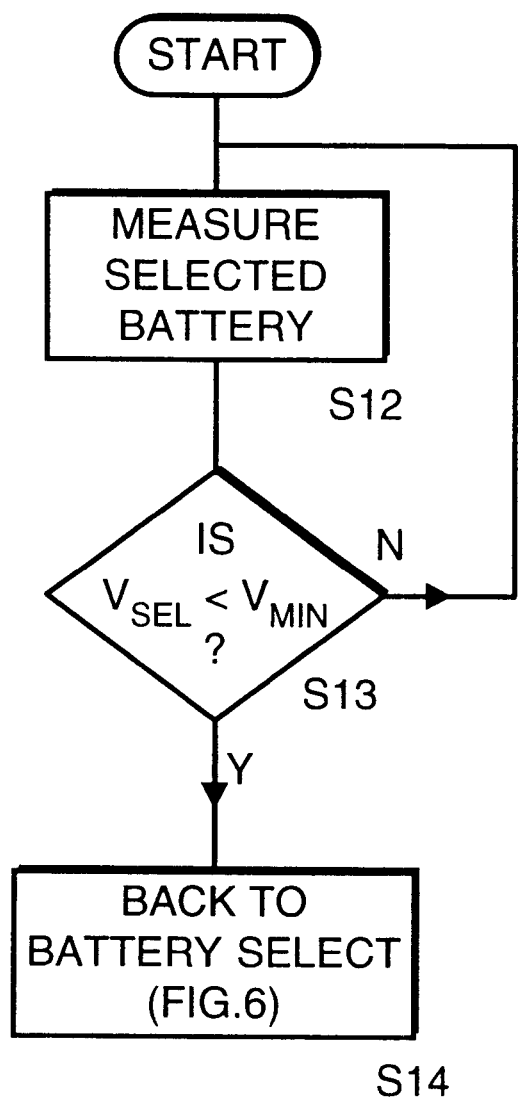
FIG. 7 is a process flow diagram for monitoring charge left in the selected battery.

Referring to FIGS. 6 and 7, a description of how the control device 7 controls discharging of the batteries will now be described.

When the mobile handset 1 is not sitting in the power supply unit 3, the toggling unit 10, switches the battery into a discharge mode. i.e. power from the batteries is diverted to the telecommunications circuitry 9 of the handset 1. When the handset 1 is switched on, the control device 7 selects either the first or second battery 6a, 6b for use. This selection is illustrated in FIG. 6. Initially, the control unit 13, commands the voltmeter unit 11, to measure the voltages of the first battery 6a (step S1) and the second battery 6b (step S2), which returns values of $V_a$ and $V_b$, respectively. These voltages are compared (step S3) in the control unit 13, to determine whether the first battery 6a is more fully charged than the second battery 6b.

If $V_a \geq V_b$ is true, then the first battery 6a is more fully charged. The second battery 6b is tested to determine whether it is partially charged (step S4). If it is charged, it is selected to be used (step S5). If on the other hand it is discharged, then the first battery 6a is tested to determine whether it is charged (step S6). If the first battery 6a is charged, it is selected (step S7). If on the other hand it too is discharged, then neither battery is sufficiently charged to power the mobile handset 1.

If the test in step S3 indicates that the first battery 6a is less charged than the second battery 6b, the first battery is tested to determine whether it is partially charged (step S8). If partially charged, the first battery 6a is selected (step S9). Otherwise, the same test is performed on the second battery 6b (step S10) and is selected (step S11) if partially charged.

Referring to FIG. 7, once a battery is selected for use, it is used exclusively until it is discharged. While the selected battery is in use, its voltage is measured (step S12) and tested to determine whether it still is sufficiently charged (step S13). Once it becomes discharged, with V falling below the fully discharged voltage, $V_{min}$, the control device 7 returns to the battery selection routine as shown in FIG. 6.

Figure 8:
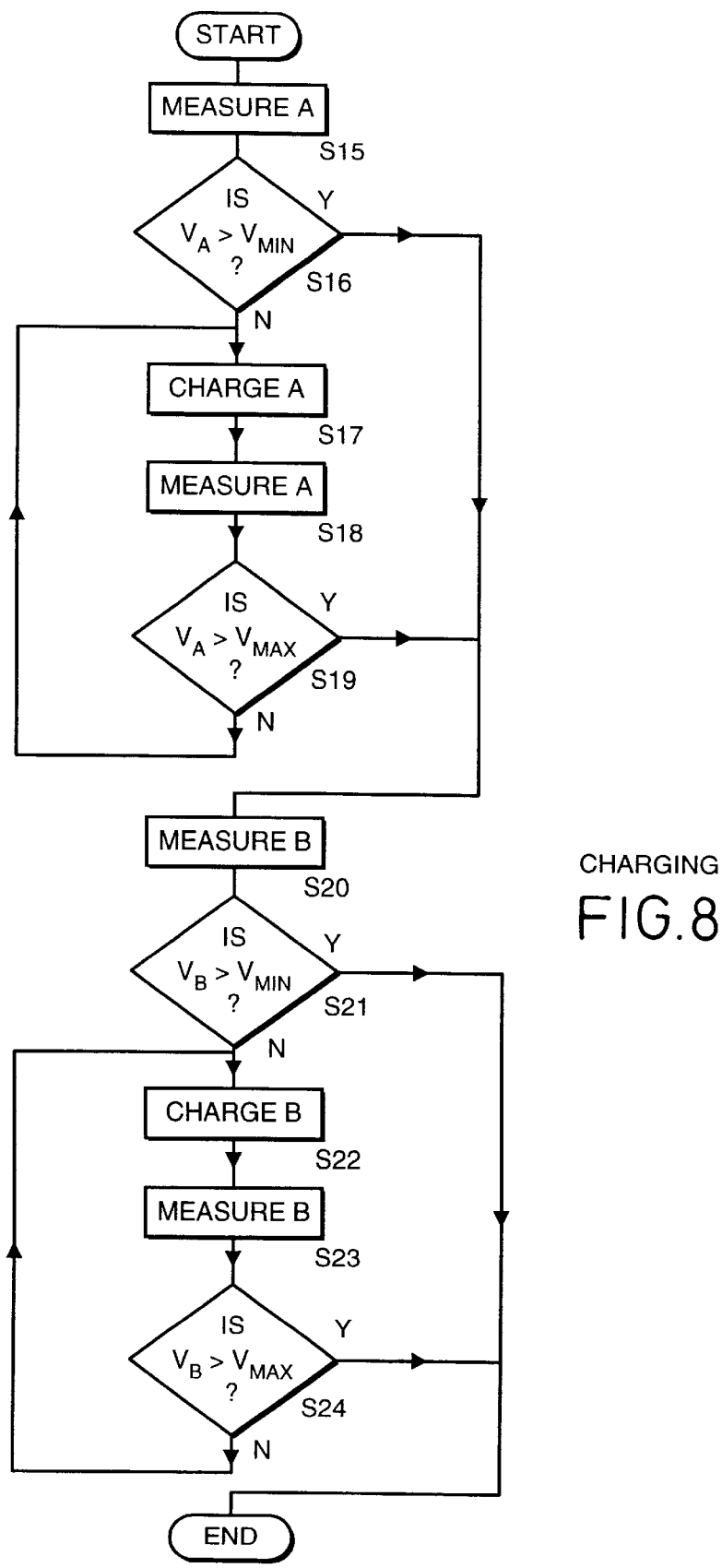
FIG. 8 is a process flow diagram for determining each battery's suitability to be charged.

Referring to FIG. 8, a description of how the charging circuit operates will now be described in detail.

During charging, the voltage of the first battery 6a is measured (step S15). The control unit 13, tests the first battery 6a to determine whether it is discharged (step S16). If the first battery 6a is discharged, the routine allows it to be charged (step S17). The voltage of the first battery 6a is measured (step S18) and compared with the maximum charging voltage, $V_{max}$ (step S19). If the battery voltage, V, has not reached maximum charging voltage, $V_{max}$, then the first battery 6a has not been fully charged and further charging is allowed (step S17). This cycle continues until the first battery 6a is fully charged. The routine moves on to test the second battery 6b. The routine also moves on if it is determined that the first battery 6a is already partially charged (step S16).

The testing/charging routine for the second battery 6b is identical. The second battery 6b is measured (step S20) and tested to determine whether it is discharged (step S21). If it is discharged, then charging starts (step S22) otherwise the routine ends. The battery voltage is measured (step S23) and checked whether it has reached the maximum charging voltage, $V_{max}$ (step S24). If it has not, charging continues. Once charging is complete (step 24), the routine ends.

When the battery is placed in the power supply unit 3 for charging, it is very likely that the control device 7a will find the batteries 6a, 6b in a partially charged state. There are two contributing reasons. Firstly, all rechargeable batteries self-discharge, even when disconnected from a circuit. The rates of self-discharge can be high, especially for a fully charged battery. Secondly, charging may be interrupted. The control device 7, having detected that a battery is fully discharged, permits charging of a battery. If charging process is interrupted and the battery is only partially charged then the control device 7a prevents the battery from being charged further.

If the user wishes, the charging process can be overridden to always provide fully charged batteries. One method is to indicate the battery level, so allowing the user to manually discharge the battery through a load resistor, before continuing charging. Alternatively, the control device 7 can be configured to fully discharge any partially charged batteries that it finds and then fully charge them.

In summary, the control device 7 maximises the lifetime of the batteries. It does this in two ways. Firstly, the control device 7 only allows fully discharged batteries to be charged. Secondly, the control device 7 allows only the least charged battery to provide power to the handset 1 and it is compelled to do so until it is fully discharged. In doing so, the control device 7 ensures that batteries are always discharged fully. In this way, batteries are always subjected to full charging cycles.

It will be appreciated that many modifications can be made to the embodiment described.

For example, the rechargeable batteries may be of the Nickel Cadmium (NiCd) type or any battery type that exhibits memory effect.

The partitioned battery may be partitioned into three, four, five or even more batteries. This has the advantage of ensuring that the most charge is stored at any one time and for quick charging times. However, this is at the expense of a more complex partitioning of battery and more complicated measuring, comparison and switching circuits.

There may be occasions when one battery is close to being fully discharged but still has a battery voltage greater than $V_{min}$. According to the embodiment of the invention, such a battery will not be charged. The control device can be modified to detect whether a battery is close to being fully discharged and if it is to fully discharge the battery a load resistor. Charging of the battery is then permitted.

The control device may be located in the handset circuitry rather than in the battery housing. Neither does the control device necessarily have to be a unitary circuit, but can be distributed throughout the handset, the battery and/or the power supply unit.

The control device can be modified to detect whether one battery is being charged and discharged more often. To rectify this imbalance, the control device can bias towards using the other battery more often.

A single battery need not be partitioned to obtain a plurality of batteries. The batteries may be discrete entities.

Charging of the batteries can be done in parallel, rather than sequentially, to save time.

The rechargeable batteries can be used in other battery operated devices, such as electric shavers, portable music systems, computers and toys.

What is claimed is:

1. A battery charge/discharge control system comprising:
   (a) battery operated device to be driven by a discharge current from a rechargeable cell; and
   (b) battery control device, to control charging and discharging of rechargeable cells, comprising:
       charging control circuitry to select a discharged cell and permit charging of said cell to a maximum charging level; and
       discharging control circuitry to select a partially charged cell and permit it to discharge so as to drive the battery operated device, and permit it to discharge to a discharged level.

2. A system according to claim 1 including measuring circuitry to measure the level of charging of a cell.

3. A system according to claim 2 wherein the measuring circuitry is a voltmeter.

4. A system according to claim 1 comprising a comparator to compare levels of charging of cells.

5. A system according to claim 1 including switching circuitry to switch between the cells.

6. A method of controlling charging and discharging battery cells that drive a battery operated device comprising:
   selecting a discharged cell and permitting charging of said cell to a maximum charging level; and
   selecting a partially charged cell and permitting it to discharge so as to drive the battery operated device and permitting it to discharge to a discharge level, prior to recharging.

* * * * *